J. B. Sexton.
CULTIVATOR.

No. 109554

PATENTED Nov 22 1870

Witnesses:
Chas. Kenyon
Edwd. P. Mast

Inventor:
James B. Sexton
Chipman Hosmer & Co.
Attys

J. B. Sexton.
CULTIVATOR
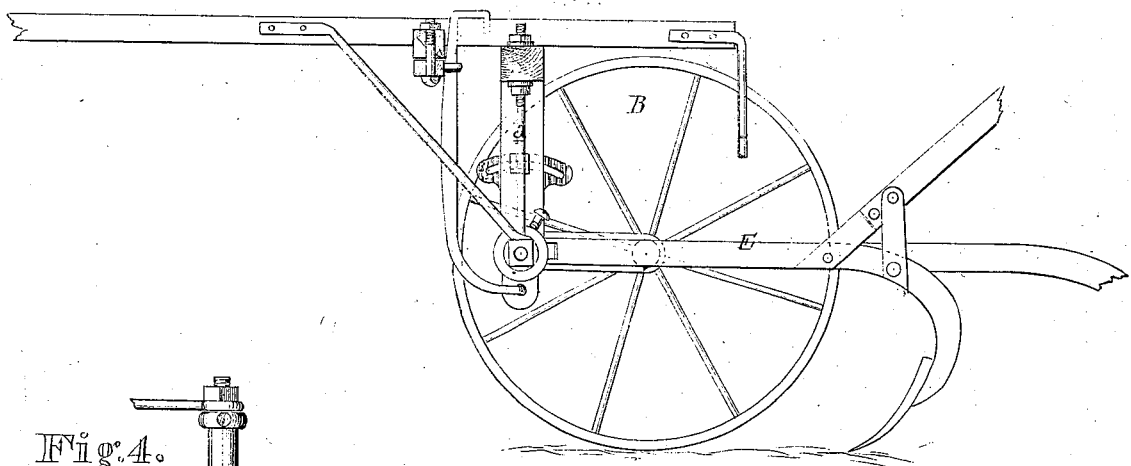
Fig. 3.
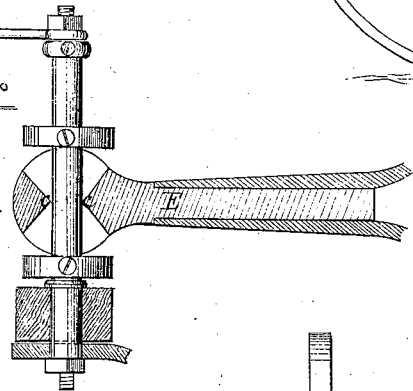
Fig. 4.
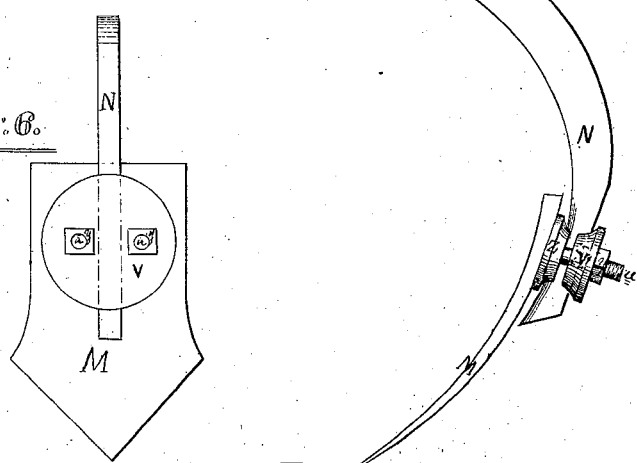
Fig. 5.
Fig. 6.
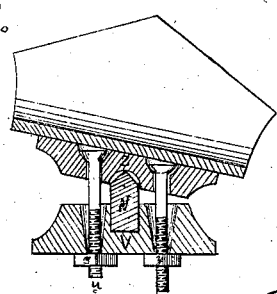
Fig. 7.
Witnesses.
Chas. Kenyon.
Edwd P. Masi.
Inventor.
James B. Sexton
Chipman & Fosmer & Co
Attorneys.

United States Patent Office.

JAMES B. SEXTON, OF PELLA, IOWA.

Letters Patent No. 109,554, dated November 22, 1870.

IMPROVEMENT IN CULTIVATORS.

The Schedule referred to in these Letters Patent and making part of the same.

*To all whom it may concern:*

Be it known that I, JAMES B. SEXTON, of Pella, in the county of Marion and State of Iowa, have invented a new and valuable Improvement in Cultivators; and I do hereby declare that the following is a full, clear, and exact description of the construction and operation of the same, reference being had to the annexed drawing making a part of this specification and to the letters and figures of reference marked thereon.

Figure 1 of the drawing is a plan view of my invention.

Figure 3 is a vertical section.

Figure 1:
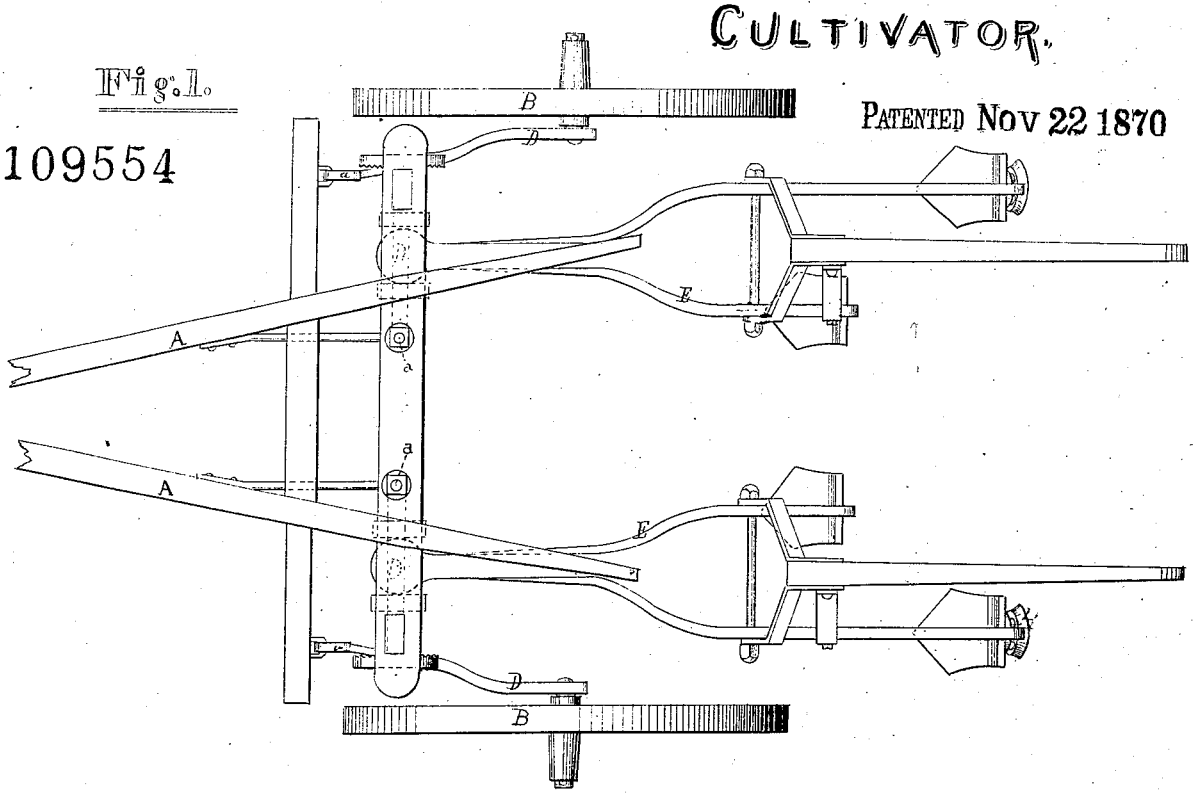

Figures 4, 5, and 6, are details.

My invention relates to means for cultivating corn and other growing plants, and consists in the construction and novel arrangement of devices intended to serve as a valuable and efficient apparatus for the purpose mentioned.

My cultivator is of that class known as straddle-cultivators, and of the sulky form, of which—

A of the drawing represents the neap or pole, and B B the wheels.

The method adopted for connecting the wheels with the carriage is shown on the drawing, and is not novel with myself, although I recommend it as a cheap and valuable mode for accomplishing that object.

The letters *a* represent two adjustable rods, extending downward from the main beam of the carriage-frame to the inner ends, respectively, of the axles D, and forming the sides of the straddle.

My method of making these rods adjustable, and thereby to raise or lower the inner ends of the axle at will, is as follows, namely:

I cut a thread upon the upper ends of these rods, respectively, and arrange upon said thread a nut above the beam, and a jamb-nut below the beam, as shown in fig. 3.

E E represent the plow-beams with plows attached, and attached, respectively, to the axles of the carriage, in the manner shown on fig. 4. It will be observed that the openings through the plow-beam, through which the axle is passed, has a novel form, in this: instead of making said opening circular in form, both in front and rear of the axle, I construct it with sharp points, as shown by the letters *c* of the drawing. The object of this method of construction is to furnish easy play-room for the plow-beam either to the right or left.

Figure 2:
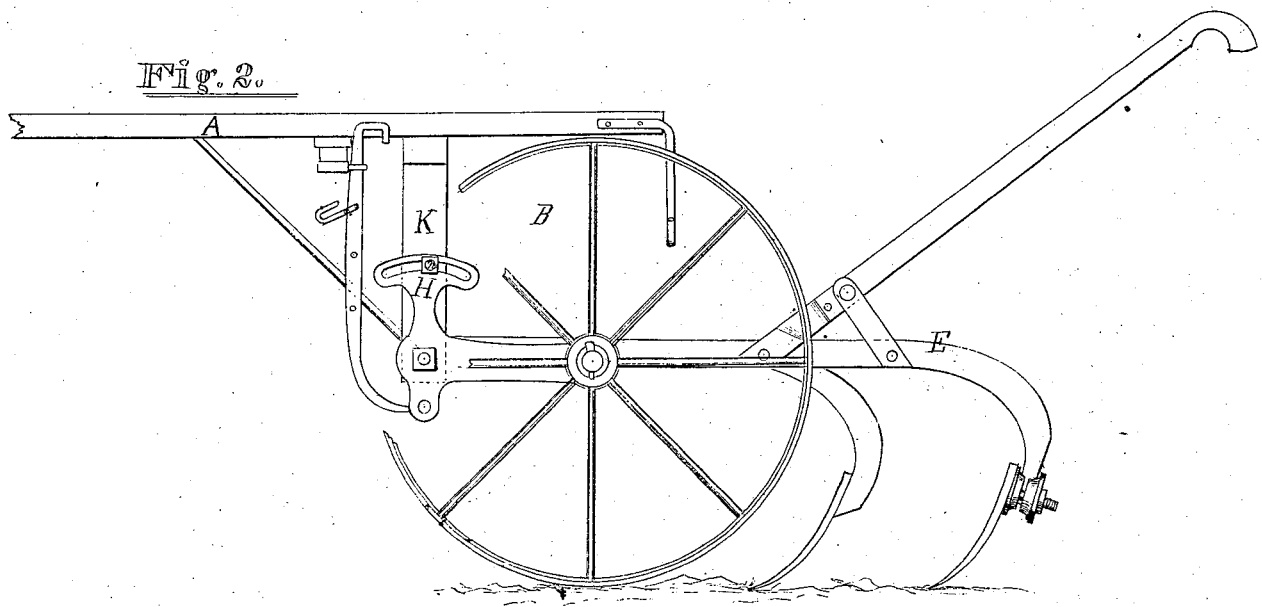
Figure 2 is a side view.

My device for adjusting the position of the frame with reference to the plow-beams, and thereby arranging the pitch of the plows at will, is exhibited on fig. 2, and consists in forming a circular slot in the adjustable plate H, and corrugating the inner side of said plate adjoining the upright frame-post K, and arranging in said slot the pin and nut *n*, in the manner represented. By corrugating the side of this plate adjoining the post, the position desired is maintained, with less strain upon the pin and nut than would otherwise be possible.

My method of adjusting the plows upon their standards, respectively, is shown on figs. 2, 5, and 6 of the drawing, in which M represents the plow, N the standard, *u u* pins, attached to the plow, upon the ends of which threads are formed, as shown.

The letter *v* is a removable and adjustable cap, through which the pins *u u* are passed, and in which they are secured by screw-nuts *y y*.

It will be observed that the flange or plate Z on the rear part of the plow, together with the side of the cap *v* next the standard, are slotted in such a manner as to receive said standard; and that, when the screw-nuts are on duty, said standard is clamped, and the plow held in any desired position thereon.

What I claim as my invention, and desire to secure by Letters Patent, is—

1. In a cultivator, the diamond-shaped couplings *c c*, when constructed and arranged substantially as and for the purpose specified.

2. In a cultivator, the adjustable and corrugated axle-plate H, when constructed and arranged as and for the purpose set forth.

3. In a cultivator, the plate Z, pins *u u*, and cap *v*, with the screw-nuts, as described, when the several parts are constructed and arranged substantially as and for the purpose specified.

In testimony that I claim the above, I have hereunto subscribed my name in the presence of two witnesses.

JAMES B. SEXTON.

Witnesses:
CHAS. KENYON,
EDWD. P. MASI.